March 19, 1963 T. F. LEWIS 3,081,788
AIR BLEEDER VALVE FOR HYDRAULIC SYSTEMS
Filed March 28, 1962 2 Sheets-Sheet 1

INVENTOR.
THOMAS F. LEWIS
BY Cullen & Cantor
ATTORNEYS

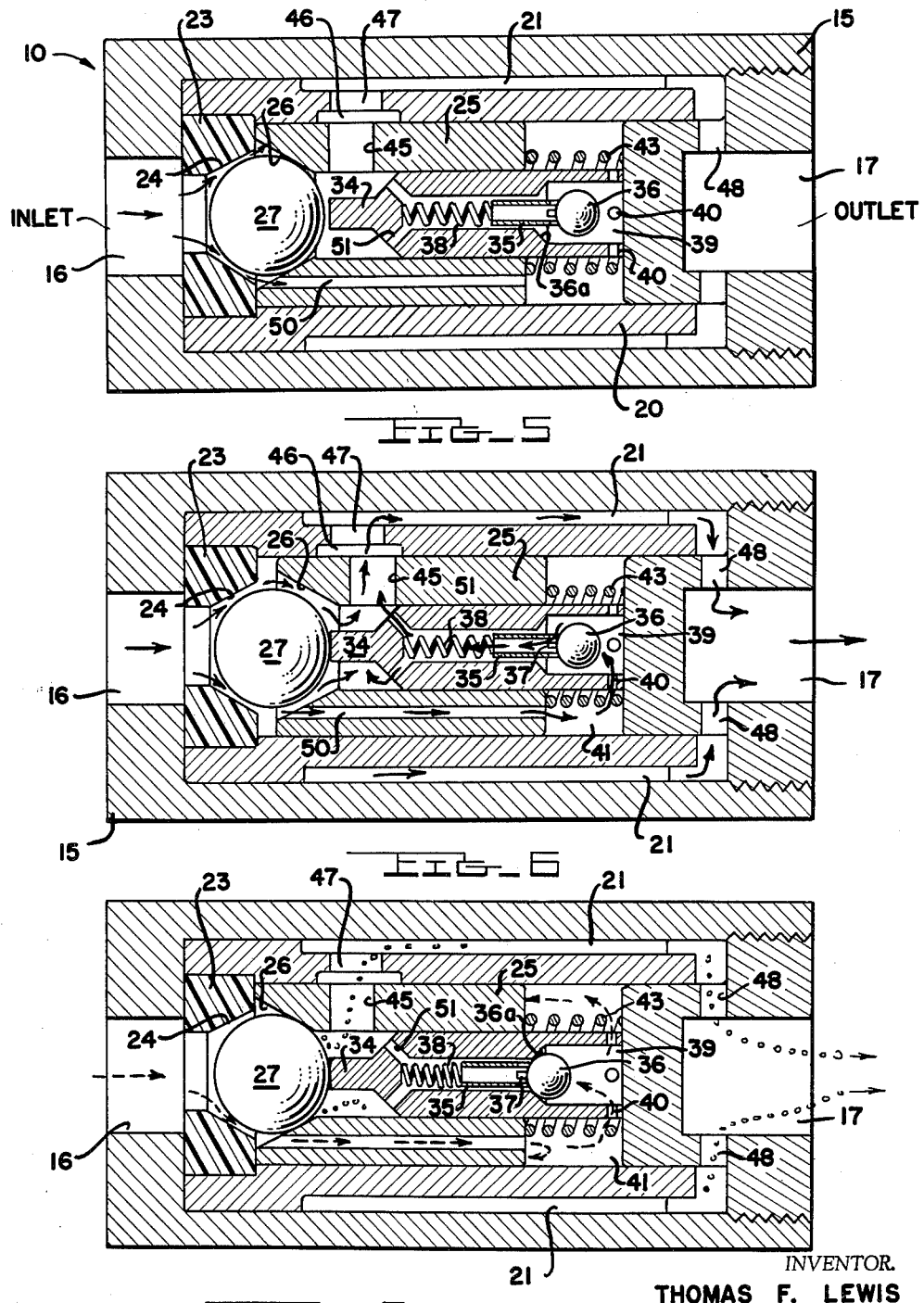

United States Patent Office 3,081,788
Patented Mar. 19, 1963

3,081,788
AIR BLEEDER VALVE FOR HYDRAULIC
SYSTEMS
Thomas F. Lewis, 67 Bellcrest Ave.,
East Northport, N.Y.
Filed Mar. 28, 1962, Ser. No. 183,705
10 Claims. (Cl. 137—198)

This invention relates to a valve and more particularly, to a purge or bleed valve useful for separating a light weight, low viscosity fluid, such as air, from a heavy weight, high viscosity, fluid, such as oil.

In the use of hydraulic systems, one problem frequently encountered as the removal of air which seeps into the hydraulic fluid lines, particularly when the hydraulic system is idle for some period of time or is newly installed, which air has a deleterious effect upon the operation of the various instruments and equipment of the hydraulic system. Hence, various means have been used in the past to permit the air to escape while retaining the fluid and the fluid pressure within the lines. None of these means has proven to be totally satisfactory or reliable in operation.

Hence, this invention is concerned with an automatically operating purge or bleed valve which opens at the start of operation of a hydraulic system to permit the escape of air and which closes after the air escapes and the hydraulic fluid reaches the valve, and which permits whatever air is left to bleed out through the valve even though the valve is closed to the hydraulic fluid.

Thus, it is an object of this invention to provide a purge or bleed valve formed of two valve elements, one being a main valve which opens automatically to permit the escape of air at the start of operation of a hydraulic system but which closes during idle times to prevent backflow of air into the system, and the second being a sensing valve means which operates in response to the change of flow from air to hydraulic fluid to cause the main valve to close; the main valve being additionally formed to permit the bleeding of air through it while it is closed and the hydraulic system is operating.

The valve herein may be used to separate a light weight, low viscosity fluid from a heavy weight, high viscosity fluid. Hence, although the description herein relates to use of the valve to separate entrapped air from oil, it is to be understood that the valve is useable for other similar purposes.

These and other objects and advantages of this invention will become apparent upon reading the following description, of which the attached drawings form a part.

In these drawings:

FIGS. 5–7 are views similar to FIG. 1 but showing the valve in various operating positions.

Figure 4:
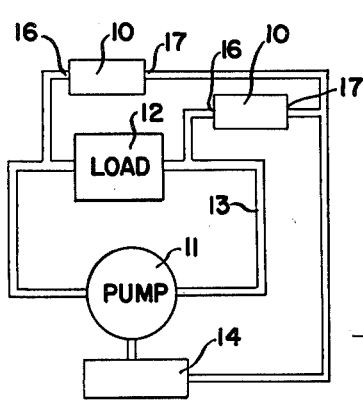
FIG. 4 is a schematic diagram showing the application of the valve to a simple hydraulic system.

FIG. 4 schematically illustrates two valves 10 used as purge or air bleed valves in a hydraulic system having a load 12 and a pump 11 interconnected by hydraulic lines 13. The system fluid reservoir 14, through which air may escape, catches and retains the small spurt of hydraulic fluid incidental to closing valve 10. The valve housing 15 is provided with an inlet 16 connected to the hydraulic system and an outlet 17 connected to the reservoir 14.

In the schematic illustration, the valve functions to bleed off or permit the escape of air trapped within the hydraulic lines.

Positioned within the housing is a sleeve 20, at least a portion of which is spaced from the inner wall of the housing to form a fluid passageway space 21. The inlet end of the housing is provided with a flange 22 against which is positioned a fixed position seal 23, having a sloping sealing or seat surface 24. The seal is formed of a relatively soft, resilient material, as compared to metal, such as some suitable plastic material, as for example, polytetraethylfluorine, commonly known as "Teflon."

Slidably arranged within the sleeve 20 is a piston 25 having one end formed as a sloping sealing seat 26 arranged opposite to and opposing the seat 24. Located between the two seats is a ball valve 27 of a size to contact either one, but not both of the seats simultaneously.

The piston 25 is formed of a hollow tube which receives therein a hollow rod 30 which is fixed against movement and abutted or fastened to an end sealing spacer 31 which in turn is abutted against or connected integrally to an end closure 32 which closes the outlet end of the housing. The opposite end of the rod 30 is formed as an extension 34 which forms a stop or abutment for engaging and limiting the movement of the ball 27.

Figure 1:
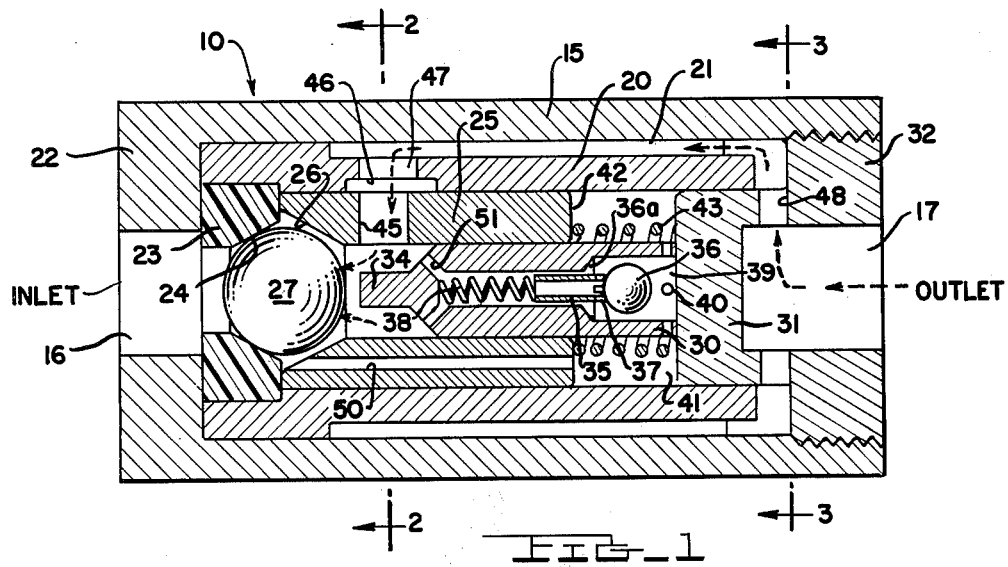
FIG. 1 is a cross-sectional, elevational view of the valve herein.
Figure 2:
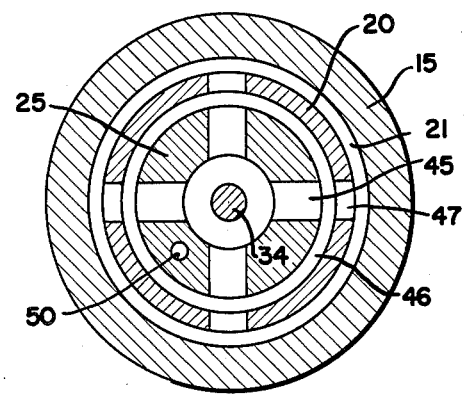
FIG. 2 is a cross-sectional view taken in the direction of arrows 2—2 in FIG. 1.
Figure 3:
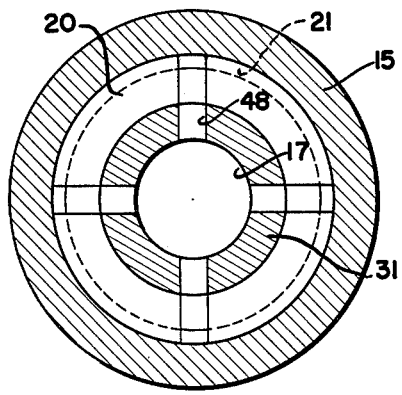
FIG. 3 is a cross-sectional view taken in the direction of arrows 3—3 of FIG. 1.

Slidably fitted within the hollow interior of the rod 30 is a hollow tube 35 and a sensing ball valve 36 at its end, with openings 37 formed in the tube wall at its juncture with the ball, and with the tube being resiliently urged towards the closure end of the housing by means of a spring 38. The interior of the rod, where the ball 36 is located, is widened to form a seat 36a and a rod chamber 39 which communicates through openings 40 with a piston chamber 41 formed between the sealing spacer 31 and the piston end 42 of the piston 25. The piston is spring urged by means of an extremely low rate spring 43 towards and into contact with the seal 23 as shown in FIG. 1. The low rate spring is of the type whose loading changes insignificantly with its deflection.

The piston 25 is provided with main fluid passageways 45 which communicate with an interior groove 46 formed in the sleeve, which communicate through openings 47 into the space 21 surrounding the sleeve, in turn connected by passageways 48 to the outlet 17.

In addition, a bypass fluid passageway is provided by a drilled hole 50 extending the length of the piston 25 and opening at the seat 26 and into the piston chamber 41. The passageway continues through the openings 40 in the rod, through the interior of the rod, around the spring 38, and then through rod openings 51 back to piston passageway 45.

OPERATION

*Shut-down position.*—FIG. 1 illustrates the valve in its shut-down position, that is, when the hydraulic system is idle. Hence, there is no material pressure toward the inlet end of the valve 16 and as a result, gravity pressure from the reservoir 14, below the valve, causes an inclination to flow therein (shown in broken arrows) from the outlet 17 through opening 48 and space 21 and then through piston openings 45 against the rear or outlet side of the ball 27 to thereby tightly press the ball against the seat 24. The seat being of a soft or resilient or both material tightly seals with the ball to prevent the passage of hydraulic fluid or air into the inlet and thereby prevents any back-flow into the hydraulic system.

*Air expelling position.*—With reference to FIG. 5, when the hydraulic system is started up, the accumulated air in the system presses against the ball 27 to move it against seat 26. The air further presses the movable seat 26 to thereby push the piston 25 against the force of its spring 43 towards the outlet end of the valve.

As shown in FIG. 6, the ball ultimately is stopped by the extension 34 and the piston moves beyond the ball so the air may pass around the ball and out through the passageways 45 in the piston where it continues out through the space 21, the opening 48 and then out of the outlet 17 to the top of the reservoir where it is permitted to escape. In FIGS. 5 and 6, the movement of the air is shown by solid line arrows.

In addition, the air moves through the drilled hole 50 and into the piston chamber 41, through openings 40 into the enlarged rod opening 39, around the sensing valve ball 36, through the openings 37 in the tube 35, around the spring 38 and out through openings 51 back to the piston opening 45. Hence, two complete routes are followed by the air, the main route and the by-pass route.

*Oil sealed-air bleed position.*—With reference to FIG. 7, when the air is substantially removed, oil tends to flow through the valve (illustrated by broken line arrows). The oil flows through the by-pass hole 50 into the piston chamber 41 and through openings 40 into the enlarged opening 39 of the rod 30. The higher pressure generated by the oil plus its higher viscosity drags the ball 36 against its seat 36a and thereby prevents the oil from continuing through the center of the rod and out opening 51. As a result, the oil builds up pressure behind the piston end 42 and with the spring 43 pushes the piston to the left (as shown in FIG. 7) into the position where the movable seat 26 seals against the ball 27 which is held in contact with the movable seat by the pressure of the inlet fluid. The piston area represented by chamber 41 is about twice the area represented by seat 26 and outer diameter of piston 25.

In this position, air bubbles bleed around the ball 27 and through the seat 26 since the seat is formed of a metal material which is sufficiently hard and rough so as not to form a perfect seal with the ball but to permit the passage of a lighter fluid such as air while blocking the passage of a heavier fluid such as oil. Hence, a constant bleed of air now takes place as shown by the bubbles illustrated in FIG. 7.

*Hydraulic system idled.*—When the hydraulic system is turned off again, the pressure at the inlet 16 drops and the fluid pressure from the outlet 17 returns the ball 27 into the position shown in FIG. 1. The pressure of the fluid trapped in chamber 41 is relieved by flow of the fluid back through hole 50 and the ball 36 returns to the position shown in FIG. 1.

It can be seen that the device herein provides a relatively uncomplicated and inexpensive valve system for permitting the escape of or separation of a light weight fluid such as air or a similar gas or light weight fluid from a heavier fluid, such as oil or the like.

This invention may be further developed within the scope of the following attached claims. Accordingly, it is desired that the foregoing description be read as being merely illustrative of an operative embodiment of this invention and not in a strictly limiting sense.

I now claim:

1. A valve comprising a fluid inlet and a fluid outlet, a ball valve located between the inlet and outlet for closing off fluid flow therebetween, a pair of opposed valve seats located on opposite sides of said ball, one being a fixed position seat arranged between the ball and the inlet and the other being a movable seat arranged between the ball and the outlet, the ball being arranged to seat against only one of the fixed and movable seats at a time to block fluid flow to the inlet and to the outlet respectively; a fluid passageway communicating with the inlet and outlet through which at least a portion of inlet fluid may pass, the passageway opening into a closed chamber, located at the end of the movable seat which is remote from the ball and communicating with said end, a weight and viscosity sensing valve arranged to close said passageway between the chamber and the outlet in response to a change of fluid flowing through it, from a light weight, low viscosity fluid to a heavier weight, higher viscosity fluid, to thereby trap fluid in said chamber for fluid pressing the movable seat into seating contact with said ball to thereby close off fluid flow from the inlet to the outlet.

2. A construction as defined in claim 1 and wherein the surface of the fixed seat is formed of a relatively soft material to completely seal the ball to the fixed seat and the surface of the movable seat is relatively hard and rough to form a seal with the ball which blocks flow of a high viscosity fluid but passes a low viscosity fluid.

3. A construction as defined in claim 1, and including stop-means formed in the valve and arranged to restrict the distance of movement of the ball away from the fixed seat, and the movable seat being spring urged towards the ball and being movable away from the ball a distance beyond that at which the ball is restrained in response to pressure of inlet fluid against the movable seat surface, wherein inlet fluid will normally pass through the fixed and movable seats around the ball to the outlet until such time as the sensing valve closes and the movable seat is thereby fluid pressed against the ball.

4. A construction as defined in claim 1 and said sensing valve comprising a ball and seat, the ball being movable by drag of high viscosity liquid into the seat for closing the valve but being non-responsive to low viscosity fluid.

5. A valve comprising a housing having a fluid inlet and a fluid outlet, a ball valve located between said inlet and outlet and a pair of opposed valve seats located at opposite sides of the ball, one seat being a fixed position seat and being arranged between the inlet and the ball, the other seat being a movable seat located between the ball and the outlet, the ball being arranged to seal against either one, but not both simultaneously, of the seats; the movable seat being formed on one end of a piston slidably fitted within the housing for sliding movement towards and away from the ball, the opposite end of the piston being in communication with a closed chamber formed in the housing; a fluid bypass passageway communicating at one end thereof with the fluid inlet and at its opposite end with the outlet and with said chamber located between its ends; a sensing valve means located between the chamber and the outlet and operative to close the chamber off from the outlet in response to a change in viscosity of fluid passing through the passageway from a low viscosity fluid to a higher viscosity fluid to thereby cause the chamber to fill with fluid from the inlet for fluid pressing the piston towards the ball to seal the movable seat against the ball.

6. A construction as defined in claim 5, and said piston having a hollow interior which forms part of said fluid passageway, the hollow interior communicating with the fluid outlet near the movable seat and with the chamber through its opposite end and being closeable between the fluid outlet and its opposite end by said sensing valve means.

7. A construction as defined in claim 6 and the remainder of the fluid passageway being formed by a hole extending through the wall of the piston from end to end thereof and opening at the face of the movable seal and at the opposite end of the piston.

8. A construction as defined in claim 5 and wherein the surface of the fixed seat is formed of a relatively soft material for completely sealing the ball to the fixed seat and wherein the surface of the movable seat is relatively hard and rough to form a seal with the ball which is sufficient to block flow of a high viscosity fluid but which passes the flow of low viscosity fluid.

9. A construction as defined in claim 5 and including a stop means arranged to restrict the distance of movement of the ball away from the fixed seal, and means spring urging the movable seal towards the ball and the movable seat being movable away from the ball a distance beyond that at which the ball is restrained in response to pressure of inlet fluid against the movable seat surface, wherein inlet fluid will normally pass through the fixed and movable seats around the ball to the outlet until such time as the sensing valve closes and the movable seat is thereby fluid pressed against the ball.

10. A construction as defined in claim 5 and said sensing valve comprising a ball and seat, the ball being movable by drag of high viscosity liquid flowing past it into the seat for closing the valve but the ball being non-responsive to low viscosity fluid.

References Cited in the file of this patent
UNITED STATES PATENTS

| | | |
|---|---|---|
| 2,689,583 | Gardiner | Sept. 21, 1954 |
| 3,012,568 | Wooldridge | Dec. 12, 1961 |